Patented July 28, 1936

2,049,299

UNITED STATES PATENT OFFICE 2,049,299

AZO DYESTUFFS AND THEIR PRODUCTION

Arthur Howard Knight, Blackley, Manchester, England, assignor to Imperial Chemical Industries Limited, a corporation of Great Britain No Drawing. Application March 22, 1935, Serial No. 12,520. In Great Britain March 28, 1934, 13 Claims. (Cl. 260—96)

This invention relates to the manufacture of new water-soluble monoazo dyestuffs.

According to the invention I obtain new water-soluble yellow and orange monoazo dyestuffs by coupling a diazotized o-mononitroaniline with an N-sulphatoethyl derivative of an amine of the benzene series which is adapted to couple in the position para to the amine group.

Also according to the invention I apply the said new dyestuffs in the coloring of acetate artificial silk, silk, tin-weighted silk, leather and wool.

In U. S. Patent No. 1,483,084 there is described the manufacture of azo dyestuffs which dye wool and silk from an acid bath and which owe their solubility in water and their acid character to the presence in their structure of the alcoholic sulphuric acid group—$C_2H_4OSO_3H$ attached to nitrogen. Dyestuffs containing this—$C_2H_4OSO_3H$ group (including soluble salts thereof) have been called "sulphato" dyestuffs.

In the prior art there is described a process of dyeing acetate artificial silk with certain sulphato monoazo dyestuffs, and in particular sulphato monoazo dyestuffs containing a nitro group. Some of these dyestuffs yield yellow or orange dyeings when applied from a neutral, acid or alkaline dyebath.

I have now found that the dyestuffs of the present invention have particular advantages over the prior art dyestuffs of similar shade. The new dyestuffs yield non-phototropic colorings on acetate artificial silk whereas the dyestuffs of the prior art derived from diazotized m-nitroaniline have the objectionable property of yielding yellow and orange colorings which are very phototropic.

Further, the prior art orange dyestuff of British Patent No. 237,739 derived from diazotized p-nitroaniline is, by reason of its poor solubility in water, unsatisfactory for the printing of acetate artificial silk. The dyestuffs of the present invention have much greater solubility in water than the known dyestuff and are particularly suitable for printing acetate artificial silk.

The new dyestuffs have very good affinity for acetate artificial silk, dyeing that material from an acid, neutral or alkaline bath. Moreover, they are valuable for the dyeing of wool, natural silk, tin-weighted silk and leather in yellow to orange shades.

Suitable o-mononitroanilines for use as first components in the invention are for example o-nitroaniline, 3-nitro-4-toluidine, 5-chloro-2-nitroaniline, 3-nitro-2-anisidine and 3-nitro-4-anisidine.

Suitable coupling components are for example N-sulphato-ethylaniline, N-sulphatoethyl-m-toluidine, N-sulphatoethyl-o-toluidine, N-sulphatoethyl-4-methoxy-3-aminotoluene, and N-methyl or N-ethyl derivatives of these.

N-sulphatoethyl-m-toluidine is obtained by reacting one molecular proportion of N-β-hydroxyethyl-m-toluidine in tetrachloroethane solution with one molecular proportion of chlorosulphonic acid, removing the solvent and crystallizing the crude sulphato compound from alcohol. It has M. P. 182° C. N-β-hydroxyethyl-N-ethyl-m-toluidine similarly yields N-sulphatoethyl-N-ethyl-m-toluidine.

N-sulphatoethyl-4-methoxy-3-aminotoluene is prepared in a similar manner from N-β-hydroxyethyl-4-methoxy-3-aminotoluene. It has M. P. 192° C.

The invention is illustrated but not limited by the following examples, in which the parts are by weight.

Example 1

A suspension of 138 parts of o-nitroaniline in 2000 parts of water and 325 parts of 31.5% hydrochloric acid is diazotized by the addition of 69 parts of sodium nitrite and the solution of the diazo compound so-obtained added to a solution of 231 parts of the free acid of N-sulphatoethyl-m-toluidine in 2400 parts of water containing 40 parts of caustic soda and to which has been added 200 parts of sodium chloride and 67 parts of sodium bicarbonate. When coupling is complete the dyestuff is isolated as the free acid by filtration, the dyestuff paste washed with a little water and then ground thoroughly with sufficient sodium carbonate to convert all the dyestuff to its sodium salt and produce a paste which reacts faintly alkaline. The dyestuff so-obtained is preserved as paste or dried in any suitable way.

The new dyestuff forms a brown powder which dissolves in water to a yellowish-red solution and dissolves in concentrated sulphuric acid to an orange-brown solution.

The new dyestuff dyes acetate artificial silk from a neutral bath containing 3% salt, giving orange shades which are non-phototropic and which are readily discharged with the usual reducing agents. It is also suitable for the direct printing of acetate artificial silk.

The dyestuff when applied from an acid bath possesses good affinity for wool, natural silk, and tin-weighted silk, dyeing these materials in orange shades.

When applied to leather by the method usually employed for acid dyestuffs it produces orange shades of good fastness properties.

*Example 2*

152 parts of 3-nitro-4-toluidine are diazotized in the usual way and the solution of the diazo compound added to a solution of 231 parts of the free acid of N-sulphatoethyl-o-toluidine in 2400 parts of water containing 40 parts of caustic soda and to which have been added 200 parts of sodium chloride and 272 parts of sodium acetate, the temperature of the solution being 5° C.

When coupling is complete the dyestuff is filtered off and the dyestuff paste ground with 212 parts of sp. g. .88 ammonia. The ammonium salt of the dyestuff is thus obtained and it can be preserved as paste or dried in any suitable way.

The new dyestuff forms a red powder which dissolves in water to a yellowish-red solution and dissolves in concentrated sulphuric acid to a blackish-brown solution.

The new dyestuff dyes acetate artificial silk in reddish-yellow shades, which are non-phototropic, when applied from a neutral bath containing 3% salt or from an alkaline bath. It is also suitable for the direct printing of acetate artificial silk (see Example 4).

*Example 3*

217 parts of the free acid of N-sulphatoethyl-aniline are dissolved in 2400 parts of water containing 40 parts of caustic soda. This solution is added to a solution obtained by diazotizing 138 parts of o-nitroaniline in the usual way to which have been added 200 parts of sodium chloride and 200 parts of sodium acetate. When combination is complete the acid dyestuff is filtered off, converted into its sodium salt by grinding with sodium carbonate and preserved as paste or dried in any suitable way.

It is soluble in hot water and dyes acetate artificial silk in yellow shades, which are non-phototropic, when applied from a neutral bath containing 3% salt.

It is also suitable for the direct printing of acetate artificial silk.

*Example 4*

1 part of the sodium salt of the dyestuff obtained by coupling diazotized 4-chloro-2-nitro-aniline with N-sulphatoethyl-3-amino-4-methoxytoluene is dissolved in 31 parts of warm water and to this solution are added 5 parts of triethanolamine and 63 parts of gum Senegal thickening (1:1). Acetate artificial silk is printed with the resulting mixture, dried, steamed at 100° C. for half an hour, washed in cold water to remove the thickening and dried in the usual way. In this way deep reddish-orange prints are obtained which are free from specks.

I claim:—

1. Process for the manufacture of monoazo dyestuffs which comprises coupling a diazotized o-mononitroaniline with a para-coupling arylamine of the benzene series carrying an N-sulphatoethyl group.

2. Process as claimed in claim 1 in which the para-coupling arylamine is an N-sulphatoethyl-aniline.

3. Process as claimed in claim 1 in which the para-coupling arylamine is an N-sulphatoethyl-toluidine.

4. Process as claimed in claim 1 in which the para-coupling arylamine is an N-sulphato-ethyl-3-amino-4-methoxy-toluene.

5. Process as claimed in claim 1 in which the para-coupling arylamine is an N-sulphatoethyl-o-toluidine.

6. Process as claimed in claim 1 in which the para-coupling arylamine is an N-sulphatoethyl-m-toluidine.

7. Process as claimed in claim 1 in which the diazo-compound is diazotized o-nitroaniline.

8. Process as claimed in claim 1 in which the diazo-compound is diazotized m-nitro-p-toluidine.

9. Process as claimed in claim 1 in which the diazo-compound is diazotized 4-chloro-o-nitroaniline.

10. The new dyestuff having as sodium salt the formula

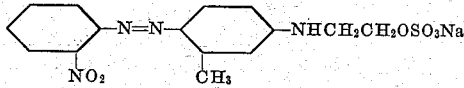

11. The new dyestuff having as sodium salt the formula

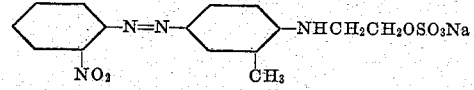

12. The compound represented by the formula:

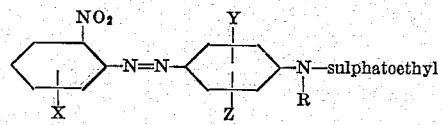

in which X is one of a group consisting of hydrogen, halogen, alkyl, and alkoxy, Y is one of a group consisting of hydrogen and alkyl, Z is one of a group consisting of hydrogen and alkoxy, and R is one of a group consisting of hydrogen and alkyl.

13. The compound represented by the formula of claim 12 in which X, Y, Z, and R are each hydrogen.

ARTHUR HOWARD KNIGHT.